United States Patent
Okamoto et al.

(10) Patent No.: US 8,686,610 B2
(45) Date of Patent: Apr. 1, 2014

(54) AUTOMOTIVE DYNAMOELECTRIC STATOR

(75) Inventors: Shogo Okamoto, Chiyoda-ku (JP);
Shinji Nishimura, Chiyoda-ku (JP);
Shiro Iizuka, Chiyoda-ku (JP); Yoshiro Imazawa, Chiyoda-ku (JP); Ken Nishikawa, Chiyoda-ku (JP); Michiya Yasui, Chiyoda-ku (JP); Kensaku Kuroki, Chiyoda-ku (JP); Yoshihiro Harada, Chiyoda-ku (JP); Naoya Nishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 431 days.

(21) Appl. No.: 13/002,273

(22) PCT Filed: Jul. 1, 2008

(86) PCT No.: PCT/JP2008/061909
§ 371 (c)(1),
(2), (4) Date: Dec. 30, 2010

(87) PCT Pub. No.: WO2010/001463
PCT Pub. Date: Jan. 7, 2010

(65) Prior Publication Data
US 2011/0109178 A1  May 12, 2011

(51) Int. Cl.
*H02K 3/50* (2006.01)
(52) U.S. Cl.
USPC .......................................................... 310/71
(58) Field of Classification Search
USPC ................................... 310/71, 184, 179, 195
See application file for complete search history.

(56) References Cited

U.S. PATENT DOCUMENTS

| 6,204,586 B1 | 3/2001 | Umeda et al. |
| 6,911,758 B2 * | 6/2005 | Oohashi ........................ 310/179 |
| 2004/0108784 A1 * | 6/2004 | Higashino et al. ............ 310/179 |

(Continued)

FOREIGN PATENT DOCUMENTS

| JP | 51-30565 Y1 | 8/1976 |
| JP | 5-130565 A | 5/1993 |

(Continued)

OTHER PUBLICATIONS

Japanese Office Action dated Jan. 8, 2013 issued in Japanese Application No. 2010-518849.

(Continued)

*Primary Examiner* — Tran Nguyen
*Assistant Examiner* — Leda Pham
(74) *Attorney, Agent, or Firm* — Sughrue Mion, PLLC (57) ABSTRACT

The present invention provides an automotive dynamoelectric stator that enables vibration resistance of a lead portion to be ensured and reductions in area of the lead portion and a coil end group that is exposed to a cooling airflow to be suppressed without increasing work or cost. In a dynamoelectric machine according to the present invention, first lead portions that connect a plurality of windings to configure phase windings are each led axially outward from a rear-end coil end group, and then disposed so as to extend parallel to an axially outer peripheral surface of the rear-end coil end group so as to cross at least one other first lead portion, and so as to be separated from the axially outer peripheral surface of the rear-end coil end group.

9 Claims, 5 Drawing Sheets

(56) References Cited

U.S. PATENT DOCUMENTS

| | | | |
|---|---|---|---|
| 2004/0145257 A1* | 7/2004 | Oohashi | 310/71 |
| 2004/0232780 A1 | 11/2004 | Oohashi | |
| 2006/0163959 A1 | 7/2006 | Ogawa et al. | |

FOREIGN PATENT DOCUMENTS

| JP | 2001-103697 A | 4/2001 |
|---|---|---|
| JP | 2004-023916 A | 1/2004 |
| JP | 2004-187469 A | 7/2004 |
| JP | 2004-215358 A | 7/2004 |
| JP | 2004-320986 A | 11/2004 |
| JP | 2004-350381 A | 12/2004 |
| JP | 2006-211810 A | 8/2006 |
| JP | 2007-159192 A | 6/2007 |
| KR | 10-2001-0067105 A | 7/2001 |
| KR | 10-2003-0091060 A | 12/2003 |
| KR | 10-2007-091514 A | 9/2007 |

OTHER PUBLICATIONS

International Search Report of PCT/JP2008/061909, dated Aug. 26, 2008.

* cited by examiner

AUTOMOTIVE DYNAMOELECTRIC STATOR

CROSS REFERENCE TO RELATED APPLICATIONS

This application is a National Stage of International Application No. PCT/JP2008/061909 filed Jul. 1, 2008 the contents of all of which are incorporated herein by reference in their entirety.

TECHNICAL FIELD

The present invention relates to an automotive dynamoelectric stator such as for an automotive alternator, etc., and particularly relates to a fixing construction for a lead portion led out from a coil end group of a stator winding.

BACKGROUND ART

In conventional dynamoelectric stators, lead portions that are formed on an end portion of a polyphase winding are laid parallel to a first coil end group, the lead portions are partially covered in a cloth tube, and the cloth tube is fixed to the first coil end group using an adhesive (see Patent Literature 1, for example).

In other conventional dynamoelectric stators, a regulating recess portion is disposed on top of a coil end group, and a lead portion is fitted into the regulating recess portion, and is fixed to the coil end group using an adhesive (see Patent Literature 2, for example).

Patent Literature 1: Japanese Patent Laid-Open No. 2001-103697 (Gazette)
Patent Literature 2: Japanese Patent Laid-Open No. 2004-023916 (Gazette)

DISCLOSURE OF THE INVENTION

Problem to be Solved by the Invention

In conventional dynamoelectric stators according to Patent Literature 1, because the lead portions are fixed to the first coil end group using an adhesive, some problems have been that a step is required for applying the adhesive, increasing time spent and costs, and that area of the lead portions and the first coil end group that is exposed to cooling airflows is reduced, giving rise to excessive temperature increases in the stator.

In other conventional dynamoelectric stators according to Patent Literature 2, because the lead portions are also fixed to the coil end group using an adhesive, some problems have been that time spent and costs are increased, and that excessive temperature increases arise in the stator. In addition, because the regulating recess portion for inserting the lead portion is disposed on top of the coil end group, another problem has been that the shape of the coil end becomes complicated, and forming the coil ends is time-consuming and expensive.

The present invention aims to solve the above problems and an object of the present invention is to provide an automotive dynamoelectric stator that enables vibration resistance of a lead portion to be ensured and reductions in area of the lead portion and a coil end group that is exposed to a cooling airflow to be suppressed without increasing work or cost.

Means for Solving the Problem

In order to achieve the above object, according to one aspect of the present invention, there is provided an automotive dynamoelectric stator including: a cylindrical stator core in which slots are arranged so as to have openings on an inner peripheral side at a predetermined pitch circumferentially; a stator winding that is mounted to the stator core so as to be mounted inside the slots, and that forms a first coil end group and a second coil end group at two axial end portions of the stator core; and a plurality of first lead portions that are constituted by a portion of the stator winding, that are led axially outward from the second coil end group, and that are disposed so as to extend circumferentially parallel to an axially outer peripheral surface of the second coil end group so as to ensure a gap between the first lead portions and the axially outer peripheral surface of the second coil end group. Each of the plurality of first lead portions is disposed so as to extend circumferentially parallel to the axially outer peripheral surface of the second coil end group so as to cross at least one other of the first lead portions.

Effects of the Invention

According to the present invention, because each of the plurality of first lead portions is disposed so as to extend circumferentially parallel to the axially outer peripheral surface of the second coil end group so as to cross at least one other of the first lead portions, vibrations of the first lead portions are suppressed by the portions crossing the other first lead portions. Thus, it is no longer necessary to form regulating recess portions that restrict positions of the first lead portions on the second coil end group, enabling vibration resistance of the first lead portions to be ensured without increasing work or cost. In addition, it is no longer necessary to fix the first lead portions to the second coil end group using an adhesive, enabling reductions in area of the first lead portions and the second coil end group that is exposed to cooling airflows to be suppressed, suppressing excessive stator winding temperature increases.

BEST MODE FOR CARRYING OUT THE INVENTION

Figure 1:
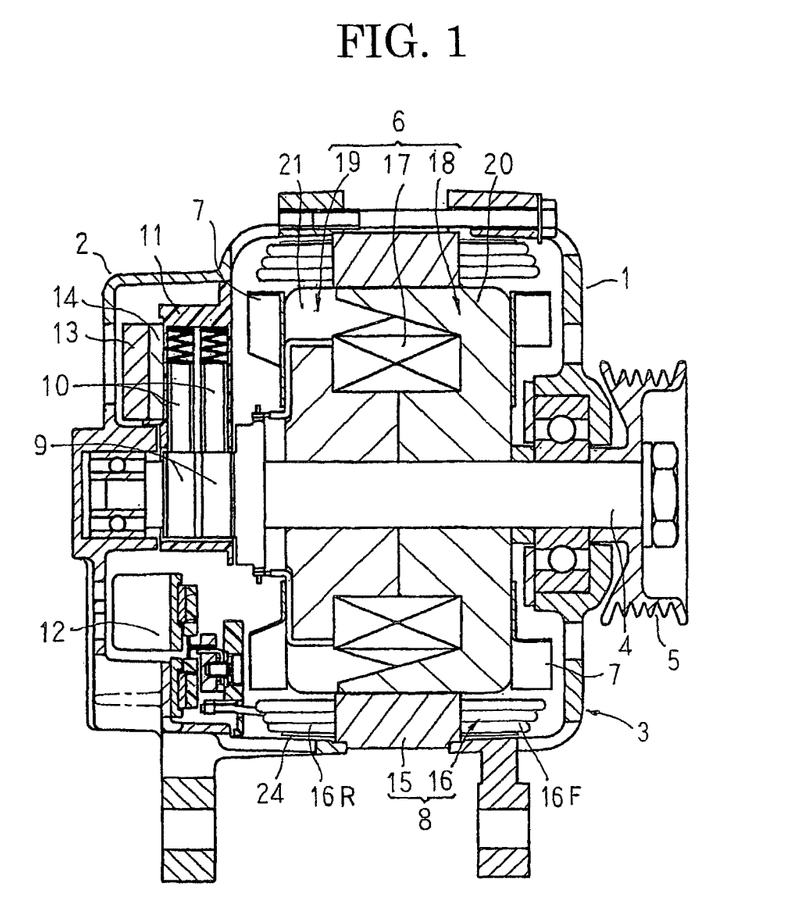
FIG. 1 is a longitudinal section that shows a dynamoelectric machine to which a stator according to a preferred embodiment of the present invention is mounted.
Figure 2:
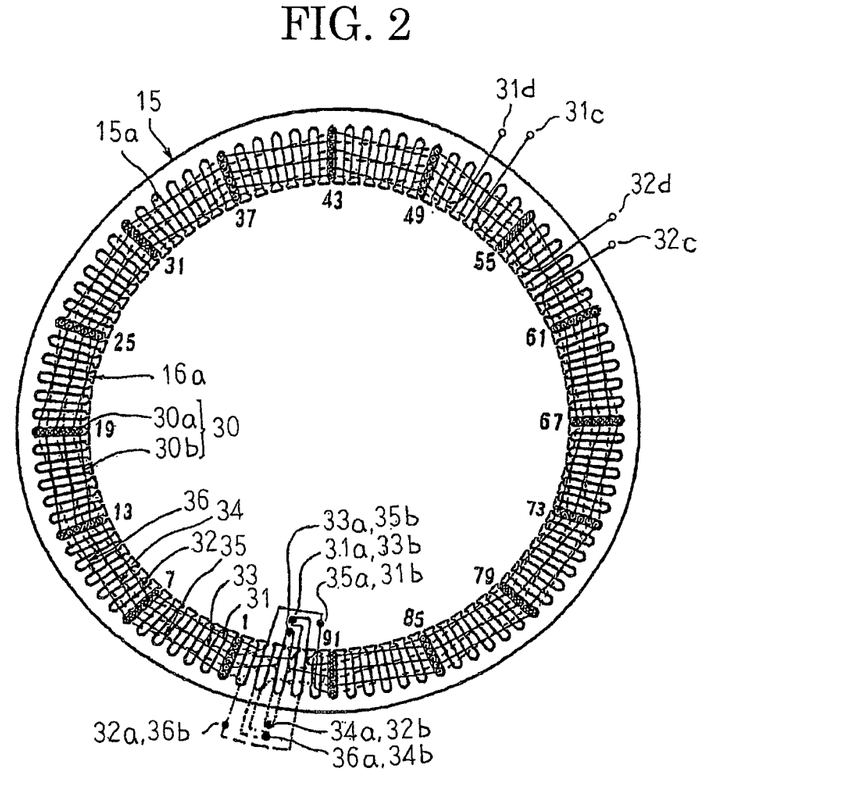
FIG. 2 is a rear-end end elevation of a stator core that explains a configuration of a stator winding in the stator according to the preferred embodiment of the present invention.
Figure 3:
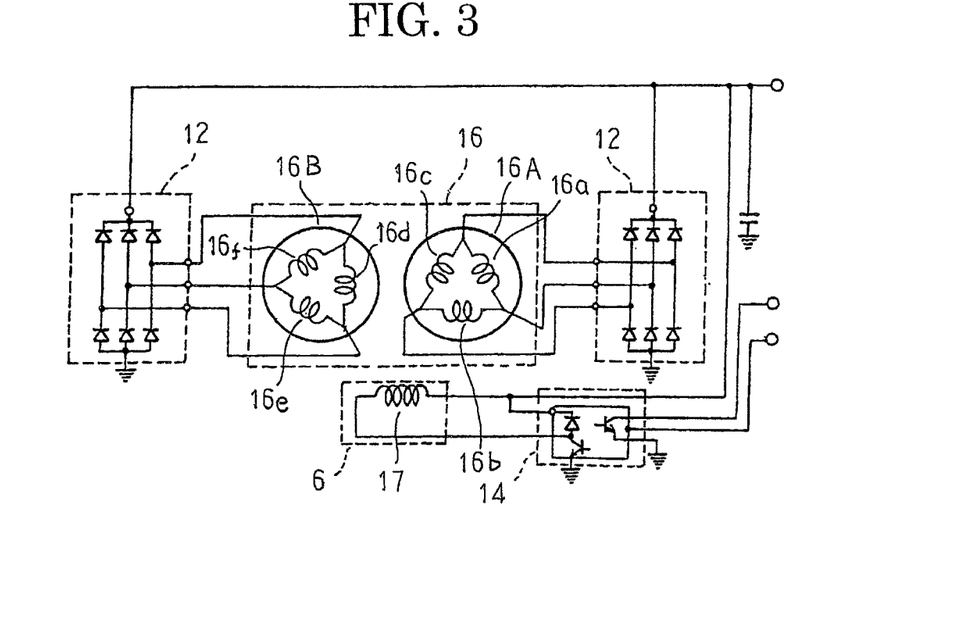
FIG. 3 is a circuit diagram for the dynamoelectric machine to which the stator according to the preferred embodiment of the present invention is mounted.
Figure 4:
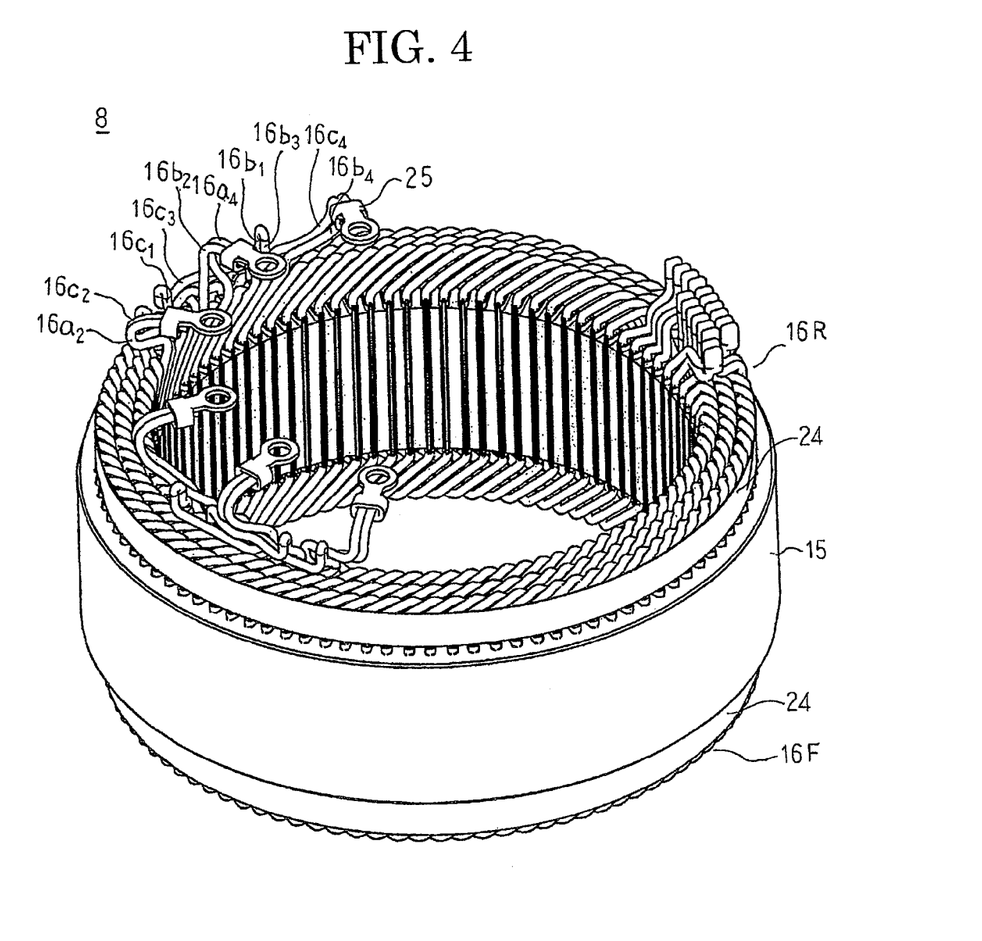
FIG. 4 is a perspective that shows the stator according to the preferred embodiment of the present invention.
Figure 5:
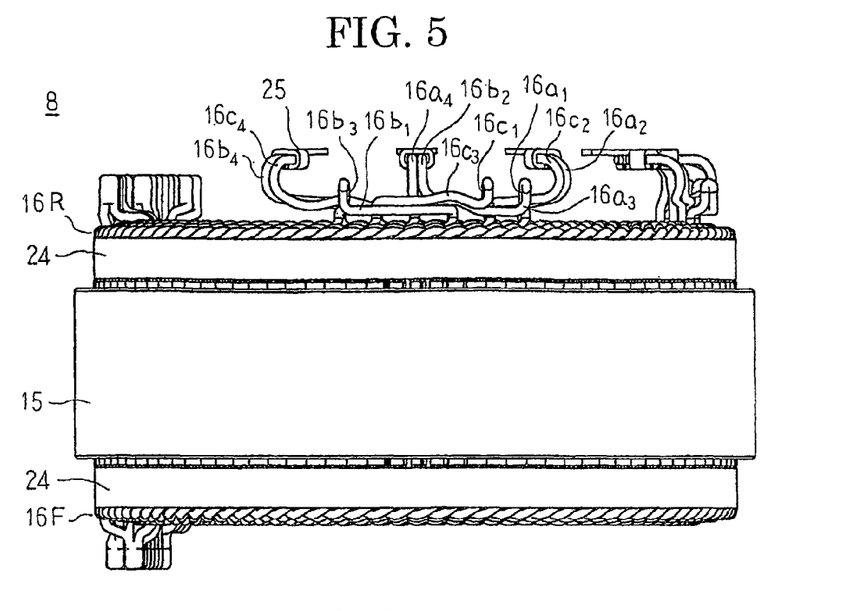
FIG. 5 is a side elevation that shows the stator according to the preferred embodiment of the present invention.
Figure 6:
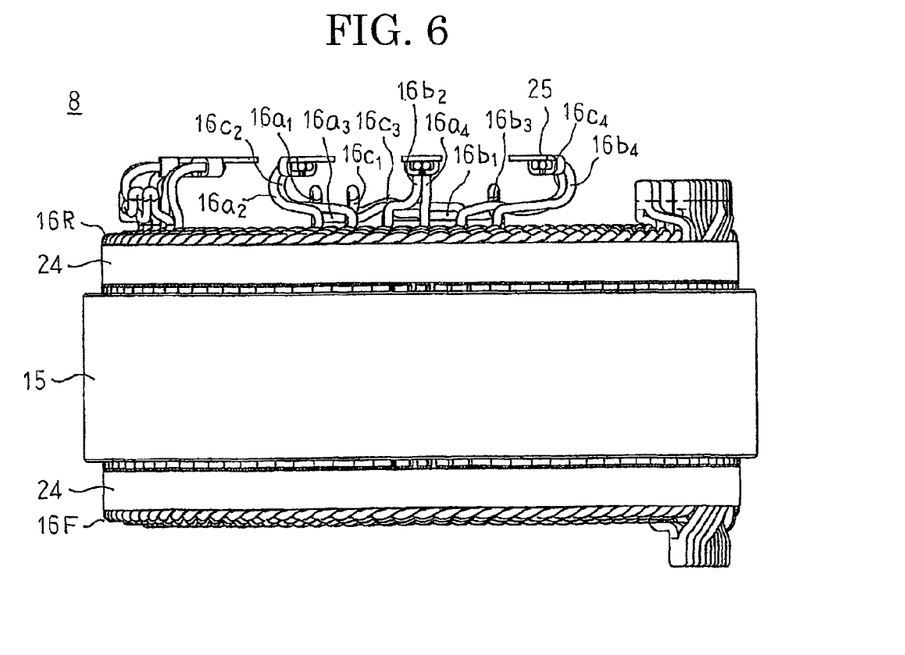
FIG. 6 is a side elevation that shows the stator according to the preferred embodiment of the present invention from an opposite side from FIG. 5.
Figure 7:
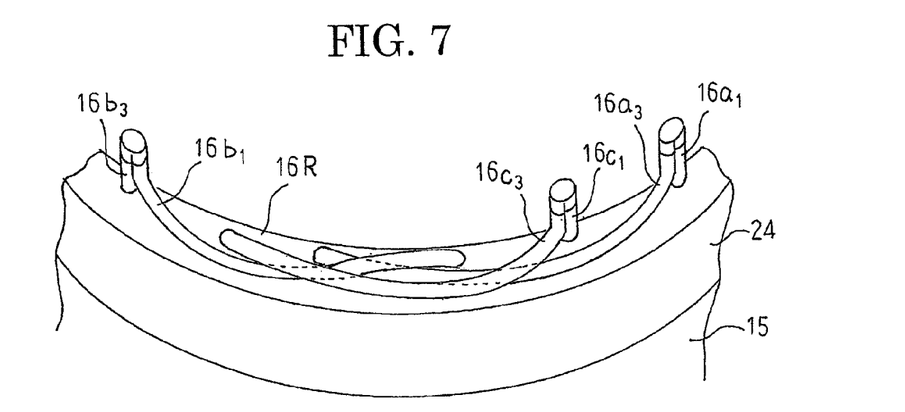
FIG. 7 is a partial perspective that shows connections of first and second lead portions in the stator according to the preferred embodiment of the present invention.
Figure 8:
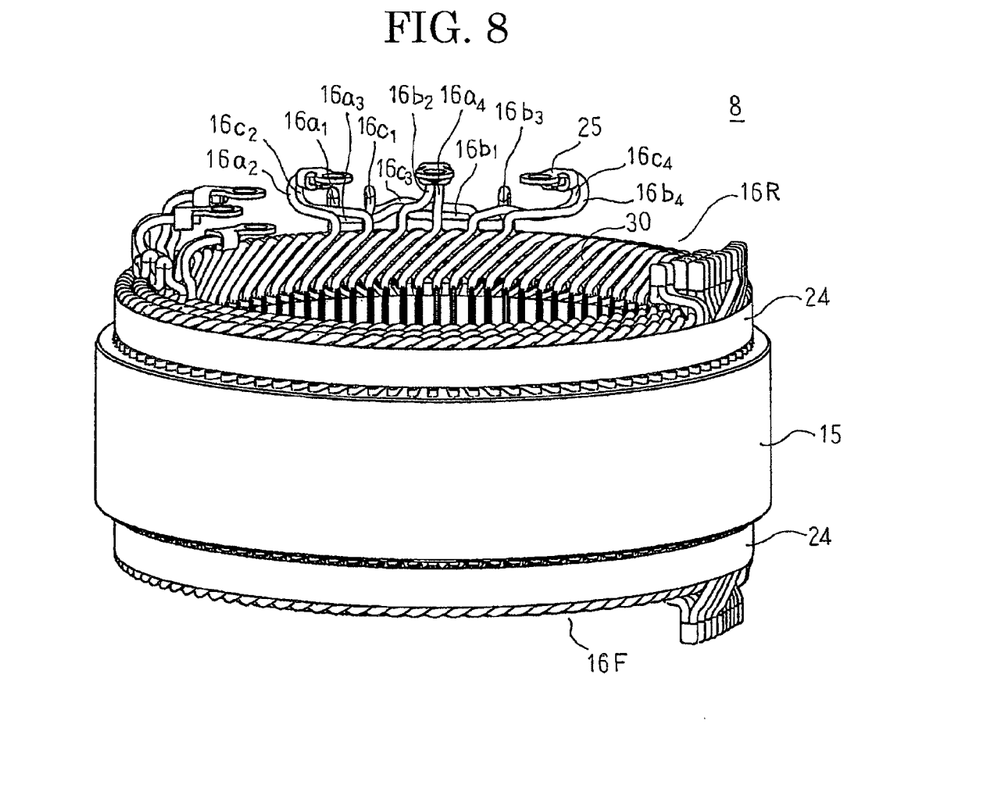
FIG. 8 is a perspective that shows the stator according to the preferred embodiment of the present invention.

FIG. 1 is a longitudinal section that shows a dynamoelectric machine to which a stator according to a preferred embodiment of the present invention is mounted, FIG. 2 is a rear-end end elevation of a stator core that explains a configuration of a stator winding in the stator according to the preferred embodiment of the present invention, FIG. 3 is a circuit diagram for the dynamoelectric machine to which the stator according to the preferred embodiment of the present invention is mounted, FIG. 4 is a perspective that shows the stator according to the preferred embodiment of the present invention, FIG. 5 is a side elevation that shows the stator according to the preferred embodiment of the present invention, FIG. 6 is a side elevation that shows the stator according to the preferred embodiment of the present invention from an opposite side from FIG. 5, FIG. 7 is a partial perspective that shows connections of first and second lead portions in the stator according to the preferred embodiment of the present invention, and FIG. 8 is a perspective that shows the stator according to the preferred embodiment of the present invention.

In FIG. 1, a dynamoelectric machine includes: a case 3 that is constituted by a front bracket 1 and a rear bracket 2 that are made of aluminum that are each approximately bowl-shaped; a shaft 4 that is rotatably supported by the case 3; a pulley 5 that is fixed to an end portion of the shaft 4 that projects outward at a front end of the case 3; a rotor 6 that is fixed to the shaft 4 and accommodated inside the case 3; fans 7 that are fixed to first and second axial end surfaces of the rotor 6; a stator 8 that is fixed to an inner wall surface of the case 3 so as to surround an outer periphery of the rotor 6; slip rings 9 that is fixed to a rear end of the shaft 4 so as to supply electric current to the rotor 6; a pair of brushes 10 that are disposed inside the case 3 so as to slide on the slip rings 9; a brush holder 11 for housing the brushes 10; rectifiers 12 that are electrically connected to the stator 8 so as to convert alternating current generated in the stator 8 into direct current; a heat sink 13 that is mounted to the brush holder 11; and a regulator 14 that is fixed adhesively to the heat sink 13 and that adjusts magnitude of alternating voltage generated in the stator 8.

The rotor 6 includes: a field winding 17 for generating magnetic flux on passage of electric current; and a pair of pole cores 18 and 19 disposed so as to cover the field winding 17, in which magnetic poles are formed by that magnetic flux. The pair of pole cores 18 and 19 are made of iron and each have eight, for example, claw-shaped magnetic poles 20 and 21 that each have an approximately trapezoidal radially-outermost surface shape disposed on an outer circumferential edge portion at a uniform angular pitch in a circumferential direction so as to project axially, and the pair of pole cores 18 and 19 are fixed to the shaft 4 facing each other such that the claw-shaped magnetic poles 20 and 21 intermesh.

The stator 8 is constituted by: a cylindrical stator core 15 that is constituted by a laminated body of magnetic steel plates; and a stator winding 16 that is installed in the stator core 15. Ninety-six, for example, slots 15a that open radially inward are formed in the stator core 15 at a uniform angular pitch circumferentially, as shown in FIG. 2. In other words, the slots 15a are formed at a ratio of two slots per phase per pole. An insulator (not shown) is mounted inside each of the slots 15a so as to ensure electrical insulation between the stator core 15 and the stator winding 16. In addition, resin outer circumference tapes 24 are wound onto radially outer peripheral surfaces of a front-end coil end group 16F and a rear-end coil end group 16R of the stator winding 16 to prevent a varnish with which the front-end coil end group 16F and the rear-end coil end group 16R are filled by trickling from flowing out.

Next, construction of the stator winding 16 will be explained.

First, construction of one phase winding that constitutes the stator winding 16 will be explained with reference to FIG. 2. Here, housing positions for conductor wires 30 inside the slots 15a will be designated Address 1, Address 2, Address 3, Address 4, Address 5, and Address 6, respectively, from radially inside to facilitate explanation. Furthermore, in FIG. 2, solid lines indicate connections at a rear end of the stator core, broken lines indicate connections at a front end of the stator core, black circles indicate joined portions, and 1, 7, 13, etc., through 91 represent slot numbers.

An a-phase winding 16a is constituted by first through sixth windings 31 through 36 that are each formed by one conductor wire 30 that functions as a wire composed of a continuous copper wire having a rectangular cross section coated with an insulator.

The conductor wires 30, which are electrical conductors, are constituted by: straight slot-housed portions 30a arranged at a pitch of six slots; and return portions 30b that alternately link end portions of adjacent slot-housed portions 30a with each other at the front end and the rear end. The conductor wires 30 are installed in the stator core 15 as wave windings such that the slot-housed portions 30a are housed in every sixth slot 15a.

The first winding 31 is configured by wave winding one conductor wire 30 so as to alternately occupy Address 2 and Address 1 in every sixth slot 15a from numbers 1 through 91. The second winding 32 is configured by wave winding one conductor wire 30 so as to alternately occupy Address 1 and Address 2 in every sixth slot 15a from numbers 1 through 91. The third winding 33 is configured by wave winding one conductor wire 30 so as to alternately occupy Address 4 and Address 3 in every sixth slot 15a from numbers 1 through 91. The fourth winding 34 is configured by wave winding one conductor wire 30 so as to alternately occupy Address 3 and Address 4 in every sixth slot 15a from numbers 1 through 91. The fifth winding 35 is configured by wave winding one conductor wire 30 so as to alternately occupy Address 6 and Address 5 in every sixth slot 15a from numbers 1 through 91. The sixth winding 36 is configured by wave winding one conductor wire 30 so as to alternately occupy Address 5 and Address 6 in every sixth slot 15a from numbers 1 through 91. In each of the slots 15a, six slot-housed portions 30a of the conductor wires 30 are arranged so as to line up in one column radially with longitudinal axes of their rectangular cross sections aligned radially so as to be surrounded by an insulator.

At the rear end of the stator core 15, an end portion 31a of the first winding 31 that projects outward from the slot 15a at number 91 and an end portion 33b of the third winding 33 that projects outward from the slot 15a at number 1 are joined together using tungsten-arc inert gas-shielded (TIG) welding, an end portion 33a of the third winding 33 that projects outward from the slot 15a at number 91 and an end portion 35b of the fifth winding 35 that projects outward from the slot 15a at number 1 are joined together using TIG welding, and an end portion 35a of the fifth winding 35 that projects outward from the slot 15a at number 91 and an end portion 31b of the first winding 31 that projects outward from the slot 15a at number 1 are joined together using TIG welding. Thus, the first winding 31, the third winding 33, and the fifth winding 35 are connected in series to form a three-turn wave winding.

At the front end of the stator core 15, an end portion 34a of the fourth winding 34 that projects outward from the slot 15a at number 91 and an end portion 32b of the second winding 32 that projects outward from the slot 15a at number 1 are joined together using TIG welding, an end portion 36a of the sixth winding 36 that projects outward from the slot 15a at number 91 and an end portion 34b of the fourth winding 34 that projects outward from the slot 15a at number 1 are joined together using TIG welding, and an end portion 32a of the second winding 32 that projects outward from the slot 15a at number 91 and an end portion 36b of the sixth winding 36 that projects outward from the slot 15a at number 1 are joined together using TIG welding. Thus, the second winding 32, the fourth winding 34, and the sixth winding 36 are connected in series to form a three-turn wave winding.

Next, a portion of the conductor wire 30 of the first winding 31 that projects outward at the rear end from the slots 15a at numbers 49 and 55 is cut, and a portion of the conductor wire 30 of the second winding 32 that projects outward from slots 15a at numbers 55 and 61 of the slots 15a is cut. Then, a cut end 31d of the first winding 31 that projects outward from Address 2 of the slot 15a at number 49, and a cut end 32d of the second winding 32 that projects outward from Address 2 of the slot 15a at number 55 are joined together by TIG welding such that a six-turn wave winding (the a-phase winding 16a) is formed in which the first through sixth windings 31 through 36 are connected in series. The cut end 31d of the first winding 31 and the cut end 32d of the second winding 32 constitute first and second lead portions that can be connected to each other in order to form a phase winding. A cut end 31c of the first winding 31 that projects outward from Address 1 of the slot 15a at number 55 and a cut end 32c of the second winding 32 that projects outward from Address 1 of the slot 15a at number 61 are end portions of the a-phase winding 16a, and constitute third lead portions that constitute output wires.

Although not shown, a d-phase winding 16d, a c-phase winding 16c, an f-phase winding 16f, a b-phase winding 16b, and an e-phase winding 16e are formed in a similar manner such that the slots into which the conductor wires 30 are installed are successively offset by one slot from each other. The a-phase winding 16a is installed in a slot group that includes numbers 1, 7, etc., through 91, the d-phase winding 16d is installed in a slot group that includes numbers 2, 8, etc., through 92, the c-phase winding 16c is installed in a slot group that includes numbers 3, 9, etc., through 93, the f-phase winding 16f is installed in a slot group that includes numbers 4, 10, etc., through 94, the b-phase winding 16b is installed in a slot group that includes numbers 5, 11, etc., through 95, and the e-phase winding 16e is installed in a slot group that includes numbers 6, 12, etc., through 96.

Next, the end portions (the third lead portions) of the a-phase winding 16a, the b-phase winding 16b, and the c-phase winding 16c are connected to each other (delta connected) to constitute a three-phase alternating-current winding 16A. The end portions (the third lead portions) of the d-phase winding 16d, the e-phase winding 16e, and the f-phase winding 16f are connected to each other (delta connected) to constitute a three-phase alternating-current winding 16B. Thus, as shown in FIG. 3, a stator winding 16 is configured that is constituted by the two delta-connected three-phase alternating-current windings 16A and 16B. Connection terminal portions among the end portions of each of the phase windings of the three-phase alternating-current windings 16A and 16B are electrically connected to the rectifiers 12 such that alternating voltages from the two three-phase alternating-current windings 16A and 16B are respectively converted into direct current and output by the rectifiers 12.

In a front-end end portion of a stator 8 that has been configured in this manner, the return portions 30b are arranged so as to line up neatly at a pitch of one slot circumferentially so as to line up in three rows radially and constitute a front-end coil end group 16F that constitutes a first coil end group.

Similarly, in a rear-end end portion, the return portions 30b are arranged so as to line up neatly at a pitch of one slot circumferentially so as to line up in three rows radially to constitute a rear-end coil end group 16R that constitutes a second coil end group.

A method for connecting together the three-turn wave windings in the a-phase winding 16a, the b-phase winding 16b, and the c-phase winding 16c, and a method for delta-connecting together the end portions of the a-phase winding 16a, the b-phase winding 16b, and the c-phase winding 16c will now be explained with reference to FIGS. 4 through 8. Now, in the a-phase winding 16a, as has been described above, a portion of the conductor wire 30 of the first winding 31 that projects outward at the rear end from the slots 15a at numbers 49 and 55 is cut, and a portion of the conductor wire 30 of the second winding 32 that projects outward from the slots 15a at numbers 55 and 61 is cut. Although not shown, in the c-phase winding 16c, a portion of the conductor wire 30 of the first winding 31 that projects outward at the rear end from the slots 15a at numbers 51 and 57 is cut, and a portion of the conductor wire 30 of the second winding 32 that projects outward from the slots 15a at numbers 57 and 63 is cut. In addition, although not shown, in the b-phase winding 16b, a portion of the conductor wire 30 of the first winding 31 that projects outward at the rear end from the slots 15a at numbers 53 and 59 is cut, and a portion of the conductor wire 30 of the second winding 32 that projects outward from the slots 15a at numbers 59 and 65 is cut.

To facilitate explanation, the cut end 31d of the first winding 31 of the a-phase winding 16a that projects outward from Address 2 of the slot 15a at number 49 will be designated lead portion $16a_1$, the cut end 31c of the first winding 31 that projects outward from Address 1 of the slot 15a at number 55 will be designated lead portion 16a2, the cut end 32d of the second winding 32 that projects outward from Address 2 of the slot 15a at number 55 will be designated lead portion 16a3, and the cut end 32c of the second winding 32 that projects outward from Address 1 of the slot 15a at number 61 will be designated lead portion 16a4.

Similarly, the cut end 31d of the first winding 31 of the c-phase winding 16c that projects outward from Address 2 of the slot 15a at number 51 will be designated lead portion $16c_1$, the cut end 31c of the first winding 31 that projects outward from Address 1 of the slot 15a at number 57 will be designated lead portion 16c2, the cut end 32d of the second winding 32 that projects outward from Address 2 of the slot 15a at number 57 will be designated lead portion 16c3, and the cut end 32c of the second winding 32 that projects outward from Address 1 of the slot 15a at number 63 will be designated lead portion 16c4.

Similarly, the cut end 31d of the first winding 31 of the b-phase winding 16b that projects outward from Address 2 of the slot 15a at number 53 will be designated lead portion $16b_1$, the cut end 31c of the first winding 31 that projects outward from Address 1 of the slot 15a at number 59 will be designated lead portion $16b_2$, the cut end 32d of the second winding 32 that projects outward from Address 2 of the slot 15a at number 59 will be designated lead portion $16b_3$, and the cut end 32c of the second winding 32 that projects outward from Address 1 of the slot 15a at number 65 will be designated lead portion 16b4.

Here, the lead portions $16a_1$ and $16a_3$ correspond to the first and second lead portions that connect together the three-turn wave windings that constitute the a-phase winding 16a, and the lead portions $16a_2$ and $16a_4$ are two end portions of the a-phase winding 16a, and correspond to the third lead portions that constitute output wires. The lead portions $16b_1$ and $16b_3$ correspond to the first and second lead portions that connect together the three-turn wave windings that constitute the b-phase winding $16b$, and the lead portions $16b_2$ and $16b_4$ are two end portions of the b-phase winding $16b$, and correspond to the third lead portions that constitute output wires. The lead portions $16c_1$ and $16c_3$ correspond to the first and second lead portions that connect together the three-turn wave windings that constitute the c-phase winding $16c$, and the lead portions $16c_2$ and $16c_4$ are two end portions of the c-phase winding $16c$, and correspond to the third lead portions that constitute output wires.

First, the lead portion $16a_1$, which constitutes a second lead portion, is led axially outward from the rear-end coil end group 16R without being bent. The lead portion $16a_3$, which constitutes a first lead portion, is led axially outward from the rear-end coil end group 16R without being bent, is bent at a position that is separated from an axially-outer peripheral surface (hereinafter "apex portion") of the rear-end coil end group 16R, and is led around counterclockwise in FIG. 7 parallel to the apex portion of the rear-end coil end group 16R so as to ensure a predetermined gap from the apex portion of the rear-end coil end group 16R. Then, the lead portion $16a_3$ is led around to a vicinity of the lead portion $16a_1$, and is then bent axially so as to be placed in close contact with the lead portion $16a_1$, and is joined to the lead portion $16a_1$ by TIG welding. Thus, an a-phase winding 16a is configured that is constituted by a six-turn wave winding in which a three-turn wave winding in which the first winding 31, the third winding 33, and the fifth winding 35 have been connected in series, and a three-turn wave winding in which the second winding 32, the fourth winding 34, and the sixth winding 36 have been connected in series, are connected in series.

Next, the lead portion $16b_3$, which constitutes a second lead portion, is led axially outward from the rear-end coil end group 16R without being bent. The lead portion $16b_1$, which constitutes a first lead portion, is led axially outward from the rear-end coil end group 16R without being bent, is bent at a position that is separated from the apex portion of the rear-end coil end group 16R, and is led around clockwise in FIG. 7 parallel to the apex portion of the rear-end coil end group 16R so as to ensure a predetermined gap from the apex portion of the rear-end coil end group 16R. Here, the lead portion $16b_1$ crosses the lead portion $16a_3$ in a state of contact with the lead portion $16a_3$. Then, the lead portion $16b_1$ is led around to a vicinity of the lead portion $16b_3$, and is then bent axially so as to be placed in close contact with the lead portion $16b_3$, and is joined to the lead portion $16b_3$ by TIG welding. Thus, a b-phase winding 16b is configured that is constituted by a six-turn wave winding in which a three-turn wave winding in which the first winding 31, the third winding 33, and the fifth winding 35 have been connected in series, and a three-turn wave winding in which the second winding 32, the fourth winding 34, and the sixth winding 36 have been connected in series, are connected in series.

Next, the lead portion $16c_1$, which constitutes a second lead portion, is led axially outward from the rear-end coil end group 16R without being bent. The lead portion $16c_3$, which constitutes a first lead portion, is led axially outward from the rear-end coil end group 16R without being bent, is bent at a position that is separated from the apex portion of the rear-end coil end group 16R, and is led around counterclockwise in FIG. 7 parallel to the apex portion of the rear-end coil end group 16R so as to ensure a predetermined gap from the apex portion of the rear-end coil end group 16R. Here, the lead portion 16c3 crosses the lead portion $16b_1$ in a state of contact with the lead portion $16b_1$, and also crosses the lead portion $16a_3$ in a state of contact with the lead portion $16a_3$. Then, the lead portion $16c_3$ is led around to a vicinity of the lead portion $16c_1$, and is then bent axially so as to be placed in close contact with the lead portion $16c_1$, and is joined to the lead portion $16c_1$ by TIG welding. Thus, a c-phase winding 16c is configured that is constituted by a six-turn wave winding in which a three-turn wave winding in which the first winding 31, the third winding 33, and the fifth winding 35 have been connected in series, and a three-turn wave winding in which the second winding 32, the fourth winding 34, and the sixth winding 36 have been connected in series, are connected in series.

Next, the lead portion 16a2 and the lead portion 16c2, which constitute third lead portions that form a pair, are led axially outward without being bent from positions at which they are led out of the rear-end coil end group 16R, are bent at positions that are separated from the apex portion of the rear-end coil end group 16R, and, as shown in FIG. 8, extend radially outward in reverse directions to the directions that the conductor wires 30 that constitute the lead portion 16a2 and the lead portion 16c2 are led out from the slots, are folded back into a U shape to extend radially inward, are brought into close proximity to each other, and are connected integrally to a metal connecting fitting 25.

Next, the lead portion $16b_2$ and the lead portion $16a_4$, which constitute third lead portions that form a pair, are led axially outward without being bent from positions at which they are led out of the rear-end coil end group 16R, are bent at position that are separated from the apex portion of the rear-end coil end group 16R, and, as shown in FIG. 8, extend radially outward, are folded back into a U shape to extend radially inward, are brought into close proximity to each other, and are connected integrally to a metal connecting fitting 25.

In addition, the lead portion $16c_4$ and the lead portion $16b_4$, which constitute third lead portions that form a pair, are led axially outward without being bent from positions at which they are led out of the rear-end coil end group 16R, are bent at position that are separated from the apex portion of the rear-end coil end group 16R, and, as shown in FIG. 8, extend radially outward in similar directions to the directions that the conductor wires 30 that constitute the lead portion $16c_4$ and the lead portion $16b_4$ are led out from the slots, are folded back into a U shape to extend radially, are brought into close proximity to each other, and are connected integrally to a metal connecting fitting 25.

Moreover, the respective third lead portions are shaped by bending so as not to project radially outward from the end surface of the stator core 15 when viewed from axially outside.

The a-phase winding 16a, the b-phase winding 16b, and the c-phase winding 16c are thereby delta-connected to configure the three-phase alternating-current winding 16A. The three-phase alternating-current winding 16A is connected to the rectifiers 12 by means of the three metal connecting fittings 25.

Moreover, although not shown, the d-phase winding 16d, the e-phase winding 16e, and the f-phase winding 16f are also respectively configured by similarly leading the respective first lead portions axially outward from the rear-end coil end group, bending them at positions that are separated from the apex portion of the rear-end coil end group, leading them around circumferentially parallel to the apex portion of the rear-end coil end group so as to cross at least one other first lead portion, and joining them to corresponding second lead portions that have been led axially outward from the rear-end coil end group 16R. The three-phase alternating-current winding 16B is also configured by similarly delta-connecting the third lead portions that are constituted by the end portions of the d-phase winding 16d, the e-phase winding 16e, and the f-phase winding 16f.

Thus, in the present invention, because respective first lead portions of six phase windings are led out from a rear-end coil end group, and subsequently led around circumferentially parallel to an apex portion of the rear-end coil end group so as to be separated from the apex portion, gaps are ensured between the first lead portions and the rear-end coil end group. Thus, reductions in area of second lead portions and the rear-end coil end group exposed to cooling airflows are suppressed, suppressing excessive stator winding temperature increases.

In vehicles, directions of vibrations from an engine that result from engine piston motion are mainly perpendicular to an axial direction of a shaft of an alternator. Thus, during engine operation, large vibrations are applied radially to the dynamoelectric machine. However, in this stator, because the first lead portions are positioned axially outside the rear-end coil end group so as to be separated from the apex portion, the first lead portions will not interfere with the rear-end coil end group even if they vibrate radially during engine operation, thereby suppressing occurrences of wire breakage, etc., in the first lead portions that result from interference with the rear-end coil end group.

Because the first lead portions that are led around circumferentially parallel to the apex portion of the rear-end coil end group cross with at least one other first lead portion in a state of close contact, overall rigidity of the first lead portions can be increased. Thus, because vibration of the first lead portions is suppressed, occurrences of wire breakage in the first lead portions and damage to the rear-end coil end group resulting from rubbing with the first lead portions, etc., are also suppressed. Because it is not necessary to form regulating recess portions for restricting displacement of the first lead portions on the rear-end coil end group, the first lead portions can be fixed to each other without increasing work or cost. In addition, because it is not necessary to use adhesive, deterioration in heat radiation is eliminated, and production control and parts management adapted to various countries of manufacture, seasons, work environments, etc., are no longer necessary.

Because the first lead portions cross lead portions that are led around parallel thereto in close contact, the first lead portions that are in close contact are joined at positions that are different from each other circumferentially. Consequently, the first lead portions that are in close contact will not interfere with the joined portions of other first lead portions that are in close contact.

Because the first lead portions that are led around circumferentially parallel to the apex portion of the rear-end coil end group are made to cross each other, the first lead portions in a first three-phase alternating-current winding can be configured using conductor wires that are led out from slots at numbers 49 through 59. In other words, because the first lead portions can be configured using conductor wires that are led out from slots that are positioned inside a narrow circumferential range at numbers 49 through 59, circumferential lengths of the first lead portions can be shortened, and, combined with the construction in which the first lead portions cross each other, vibration resistance of the first lead portions can be further increased.

Because the third lead portions that form pairs are bent after having been led outward from the rear-end coil end group, extend radially outward in reverse directions to the direction that the conductor wires that constitute the third lead portions themselves are led out from the slots, are then folded back into U shapes, and extend radially inward, and end portions thereof are joined to configure output wires that can be connected to the rectifiers 12, the degree of layout freedom for the output wires is expanded.

Because the conductor wires that constitute the third lead portions are led out from Address 1 of the slots, the third lead portions are led out from an innermost layer of the rear-end coil end group. Thus, the third lead portions are separated from a rear bracket, preventing interference with the rear bracket. In addition, because the third lead portions can be installed so as also to be separated from air discharge ports in the rear bracket, direct exposure to moisture such as salt water, etc., is also avoided, enabling resistance to salt damage also to be improved.

Because six slot-housed portions of the conductor wires that have rectangular cross sections are arranged so as to line up in single columns radially with longitudinal directions of the rectangular cross sections aligned radially, space factor of the conductor wires is increased.

Because return portions that constitute a portion of the stator winding are arranged so as to line up neatly at a pitch of one slot circumferentially so as to line up in three rows radially to constitute a rear-end coil end group, outlet positions of the respective first lead portions from the rear-end coil end group in a radial direction and a circumferential direction can be specified at a design stage. Thus, from the viewpoint of increasing mass producibility of the stator, for example, the outlet positions of the first lead portions from the rear-end coil end group can be set such that crossing shapes and crossing positions of the respective crossing portions among the first lead portions are optimal.

Moreover, in the above embodiment, the first lead portions are explained as crossing each other in close contact with each other, but it is not absolutely necessary for the first lead portions to cross each other in a state of close contact, and they may also be crossed so as to have minute air gaps interposed. In that case, even if the first lead portions are subjected to the vibrations, etc., the first lead portions are displaced, and the displaced first lead portions contact each other. Thus, the vibrations are absorbed by contact among the first lead portions, suppressing abnormal occurrences of vibration.

In the above embodiment, a stator winding is explained as being constituted by one three-phase alternating-current winding that is obtained by delta connecting an a-phase winding, a b-phase winding, and a c-phase winding, and another three-phase alternating-current winding that is obtained by delta connecting a d-phase winding, an e-phase winding, and an f-phase winding, but a stator winding may also be constituted by one three-phase alternating-current winding that is obtained by wye connecting an a-phase winding, a b-phase winding, and a c-phase winding, and another three-phase alternating-current winding that is obtained by wye connecting a d-phase winding, an e-phase winding, and an f-phase winding. In addition, a stator winding may also be constituted by a single three-phase alternating-current winding that is obtained by wye connecting or by delta connecting a phase winding in which an a-phase winding and a d-phase winding are connected in series, a phase winding in which a c-phase winding and an f-phase winding are connected in series, and a phase winding in which a b-phase winding and an e-phase winding are connected in series.

In the above embodiment, a stator core in which the number of slots is formed at a ratio of two slots per phase per pole is used, but the number of slots per phase per pole is not limited to two, and a stator core in which the number of slots per phase per pole is one may also be used, for example. In that case, the stator winding will be constituted by three phase windings.

In the above embodiment, a stator core in which slots are formed at a uniform angular pitch circumferentially is used. In other words, in the above embodiment, the slots are formed at a uniform angular pitch in which spacing between center lines of adjacent slot opening portions is $\alpha_0$ degrees. However, a stator core in which slots are formed at a nonuniform pitch in which the spacing between center lines of adjacent slot opening portions alternates between $\alpha_1$ degrees and $\alpha_2$ degrees (where $\alpha_2$ does not equal $\alpha_1$) may also be used.

In the above embodiment, respective windings that constitute phase windings of a stator winding are produced using conductor wires constituted by continuous wires, but respective windings that constitute phase windings of a stator winding may also be produced using U-shaped conductor segments.

In the above embodiment, conductor wires that have rectangular cross sections are used, but the conductor wires are not limited to having a rectangular cross-sectional shape, and may also have circular cross sections, for example. In that case, leading around of the first lead portions circumferentially is facilitated, improving producibility.

In the above embodiment, first through sixth windings are connected based on the connection method shown in FIG. 2, but the first through sixth windings are not limited to this connection method and may also be appropriately set to match any desired circuit configuration.

In the above embodiment, return portions are arranged so as to line up neatly at a pitch of one slot circumferentially so as to line up in three rows radially to constitute first and second coil end groups, but the number of rows of return portions that are lined up radially is not limited to three rows, and may also be one row, two rows, or four rows, for example.

What is claimed is:

1. An automotive dynamoelectric stator comprising:
   a cylindrical stator core in which slots are arranged so as to have openings on an inner peripheral side at a predetermined pitch circumferentially;
   a stator winding that is mounted to said stator core so as to be mounted inside said slots, and that forms a first coil end group and a second coil end group at two axial end portions of said stator core;
   a plurality of first lead portions that are constituted by a portion of said stator winding, that are led axially outward from said second coil end group, and that are disposed so as to extend circumferentially parallel to a surface of said second coil end group so as to ensure a gap between said first lead portions and said surface of said second coil end group, and
   a plurality of sets of third lead portions that are constituted by a portion of said stator winding and that respectively constitute output wires, said third lead portions being lead portions different from said first lead portions,
   wherein each of said plurality of first lead portions is disposed so as to extend circumferentially parallel to said surface of said second coil end group so as to cross at least one other of said first lead portions.

2. An automotive dynamoelectric stator according to claim 1,
   wherein at least one set of third lead portions of said plurality of sets of third lead portions is led out from said second coil end group, bent at positions that are separated from said surface of said second coil end group so as to extend radially outward in reverse directions to directions in which conductor wires that constitute said third lead portions are led out from said slots, folded back into U shapes at positions axially above an axial end portion of said stator core so as to extend radially inward, and joined together with each other at end portions thereof.

3. An automotive dynamoelectric stator according to claim 2, wherein each of said plurality of sets of third lead portions is led out from an innermost peripheral portion of said second coil end group.

4. An automotive dynamoelectric stator according to claim 1, further comprising a plurality of second lead portions that are constituted by a portion of said stator winding, and that are led axially outward from said second coil end group,
   wherein each of said plurality of first lead portions is led axially outward from said second coil end group, bent at a position that is separated from said surface of said second coil end group, led around so as to extend circumferentially parallel to said surface of said second coil end group to a vicinity of a second lead portion that is selected from among said plurality of second lead portions, subsequently bent axially, and joined to said selected second lead portion.

5. An automotive dynamoelectric stator according to claim 4,
   wherein at least one set of third lead portions of said plurality of sets of third lead portions is led out from said second coil end group, bent at positions that are separated from said surface of said second coil end group so as to extend radially outward in reverse directions to directions in which conductor wires that constitute said third lead portions are led out from said slots, folded back into U shapes at positions axially above an axial end portion of said stator core so as to extend radially inward, and joined together with each other at end portions thereof.

6. An automotive dynamoelectric stator according to claim 5, wherein each of said plurality of sets of third lead portions is led out from an innermost peripheral portion of said second coil end group.

7. An automotive dynamoelectric stator according to claim 1, wherein said stator winding is constituted by two three-phase alternating-current windings.

8. An automotive dynamoelectric stator according to claim 7, wherein each of said two three-phase alternating-current windings is a delta-connected three-phase alternating-current winding.

9. An automotive dynamoelectric stator according to claim 1, wherein said second coil end group is configured such that return portions that constitute a portion of said stator winding are arranged neatly in a row circumferentially.

* * * * *